United States Patent [19]
Miyasaka et al.

[11] Patent Number: 5,391,437
[45] Date of Patent: Feb. 21, 1995

[54] HIGH-STRENGTH COMPOSITE MATERIAL AND PROCESS FOR PRODUCING THE SAME

[75] Inventors: Takaaki Miyasaka, Higashimurayama; Akira Kajikawa, Funabashi; Masayuki Kiyomoto, Yono; Hiroshi Sakurai, Iruma; Motokazu Mano, Urawa, all of Japan

[73] Assignee: Nippon Kayaku Kabushiki Kaisha, Tokyo, Japan

[21] Appl. No.: 110,644

[22] Filed: Aug. 20, 1993

Related U.S. Application Data

[63] Continuation of Ser. No. 640,418, Jan. 11, 1991, abandoned.

[30] Foreign Application Priority Data

May 22, 1989 [JP] Japan ................. 1-126644
Jul. 17, 1989 [JP] Japan ................. 1-182526

[51] Int. Cl.$^6$ ................. C04B 26/02; C04B 26/16
[52] U.S. Cl. ................. 428/425.5; 427/337; 427/372.2; 427/385.5; 427/393.6; 428/423.1; 428/425.9; 428/688; 524/425; 524/430; 524/446
[58] Field of Search ........... 428/329, 330, 331, 423.1, 428/424.4, 425.5, 425.9, 688; 524/425, 430, 446; 427/337, 372.2, 385.5, 393.6

[56] References Cited

U.S. PATENT DOCUMENTS 3,915,917 10/1975 Weiant et al. ................. 524/430
4,352,856 10/1982 Smillie ................. 428/329

FOREIGN PATENT DOCUMENTS 0280971 9/1988 European Pat. Off. .
48-78218 10/1973 Japan .
56-59655 5/1981 Japan .
60-15468 1/1985 Japan .
62-231704 10/1987 Japan .
63-282149 11/1988 Japan .

OTHER PUBLICATIONS

Chemical Abstract, vol. 93, No. 20, Columbus, Ohio, US Abstract No. 191077H, & JP-A-55 047 287 (Agency of Industrial Sciences and Technology) Apr. 3, 1980.

*Primary Examiner*—D. S. Nakarani
*Attorney, Agent, or Firm*—Nields & Lemack

[57] ABSTRACT

A high-strength composite material obtained by kneading a mixture comprising a non-hydraulic inorganic material, a water-soluble polymer and water, molding the kneaded mixture, drying the thus molded material and, optionally, treating the dried molded material with an isocyanate compound, and a process for producing a high-strength composite material which comprises the steps of kneading a mixture comprising a non-hydraulic inorganic material, a water-soluble polymer and water, molding the kneaded mixture, and drying the thus molded material.

4 Claims, No Drawings

HIGH-STRENGTH COMPOSITE MATERIAL AND PROCESS FOR PRODUCING THE SAME

This application is a continuation of application Ser. No. 07/640,418, filed Jan. 11, 1991, now abandoned.

TECHNICAL FIELD

The present invention relates to a high-strength composite material comprising a non-hydraulic inorganic material as a main constituent, and to a process for producing the same. More particularly, the invention relates to a high-strength composite material capable of being used as a building material, such as an interior finishing material, a facing material, etc., and to a process for producing the same.

BACKGROUND ART

Hydraulic inorganic materials, a representative of which is cement, have long been used widely as structural materials and building materials. However, hardened cement bodies are poor in flexural strength, though they have high compressive strength, and many attempts have been made to improve the poor flexural strength. For instance, there have been known a method of using a water-reducing agent to reduce the amount of water added, and a method of adding silica fume or a blast-furnace slag powder so as to make the structure of a hardened cement body denser, thereby seeking an increased strength. Above all, Japanese Patent Publication No. 59-43431 (1984) discloses that, by making the addition amount of water extremely small as compared with the conventional amount and reducing the size of void and the porosity, it is possible to increase the flexural strength of a hardened cement body to at least 7 times the conventional value of 50 to 100 kgf/cm $^2$.

Besides, as a composite material using a non-hydraulic inorganic material, e.g., calcium carbonate, instead of a hydraulic inorganic material, e.g., cement, there has been known a resin concrete using a urethane resin, polyfunctional acrylic resin or other similar water-insoluble resin as a binder. The resin concrete has been widely used as a floor material, a wall material or a material for table counters.

The conventional resin concrete, using a non-hydraulic inorganic material, often contains a cross-linking type resin as a binder and, as a result, has a short pot life and is limited in kneading and molding times. Accordingly, development of a hardened body excellent in strength (especially, flexural strength) which uses a non-hydraulic inorganic material and is substantially free of such a pot-life problem is now desired.

DISCLOSURE OF THE INVENTION

The present inventors have made studies for solving the above mentioned problems and, as a result of their studies, have accomplished the present invention.

In a first aspect of the present invention, there is provided a high-strength composite material obtained by kneading a mixture comprising a non-hydraulic inorganic material, a water-soluble polymer and water, molding the kneaded mixture, and drying the thus molded material.

In a second aspect of the present invention, there is provided a process for producing a high-strength composite material which comprises the steps of kneading a mixture comprising a non-hydraulic inorganic material, a water-soluble polymer and water, molding the kneaded mixture, and drying the thus molded material.

In a third aspect of the present invention, there is provided a high-strength composite material obtained by kneading a mixture comprising a non-hydraulic inorganic material, a water-soluble polymer and water molding the kneaded mixture, drying the thus molded material, impregnating the dried molded material with an isocyanate compound, and subjecting the impregnated material to a heating treatment.

The present invention will be explained in detail below.

First, the non-hydraulic inorganic material in the present invention is an inorganic material which is not hardened upon being simply mixed with water. Examples of the non-hydraulic inorganic material include a blast-furnace slag powder, silica fume, fly ash, silica sand, silica rock powder, calcium carbonate, talc, bentonite, clay, zeolite, pearlite, deatomaceous earth, kaolin, alumina, titania, and zirconia. One or more of these materials may be used either singly or in combination.

The water-soluble polymer usable in the present invention is not particularly limited. However, it is preferable that the water-soluble polymer is dissolved uniformly and rapidly in the system being kneaded, within the keading time, and therefore is in the form of fine particles. For instance, there can be used such water-soluble polymers as follows: polyvinyl acetate derivatives such as partially hydrolyzable polyvinyl acetate, cationized polyvinyl alcohol, anionized polyvinyl alcohol, etc.; cellulose derivatives such as hydroxypropylmethyl cellulose, hydroxyethyl cellulose, carboxymethyl-cellulose, etc.; starch derivatives such as soluble starch, cationized starch, etc.; polyethylene oxide; and homo- and co-polymers prepared from the monomers mentioned below. The monomers usable for preparing the homo- or co-polymers include acrylamide monomers such as acrylamide, N,N-dimethylacrylamide, N-isopropylacrylamide, acryloylmorpholine, etc.; (meth)acrylic monomers such as tertiary amine salts of (meth)acrylic acid, sodium (meth)acrylate, 2-hydroxyethyl (meth)acrylate, 2-hydroxypropyl (meth)acrylate, dimethyl- or diethyl-aminoethyl (meth)acrylate with hydrochloric acid or sulfuric acid, quaternary ammonium salts which are the Mens hutkin reaction products of dimethyl- or diethyl-aminoethyl (meth)acrylate with methyl chloride, ethyl chloride, benzyl chloride or dimethylsulfuric acid, etc.; vinyl monomers such as N-vinylpyrrolidone, vinyl methyl ether, chloride, benzyl chloride or dimethylsulfuric acid, etc.; vinyl monomers such as N-vinylpyrrolidone, vinyl methyl ether, styrenesulfonic acid, sodium styrenesulfonate, vinylpyridine or cationized derivatives thereof, and so on. Particularly preferred water-soluble polymers are water-soluble polymers having -OH groups, for instance, polyvinyl acetate derivatives such as partially hydrolyzable polyvinyl acetate, cationized polyvinyl alcohol, aninonized polyvinyl alcohol. etc., hydroxypropylmethyl cellulose, hydroxyethyl cellulose, homo- and co-polymers of 2-hydroxyethyl (meth)acrylate or 2-hydroxypropyl (meth)acrylate.

The amount of the water-soluble polymer(s) used is preferably 1 to 15% by weight, particularly preferably 3 to 10% by weight, based on the non-hydraulic inorganic material. If the amount of the water-soluble polymer is less than 1% by weight, it is difficult to knead the mixture or, even if it is possible to knead the mixture, the resultant kneaded mixture tends to be brittle and to show poor processability in the subsequent steps. Use of the water-soluble polymer in an amount exceeding 15% by weight does not produce a significant difference in the effects of the present invention and, therefore, is disadvantageous on an economical basis; in addition, such a large amount as this makes it more difficult to achieve the improvement in water resistance, which is one of the effects of the present invention.

The amount of water used varies depending on the kind of the non-hydraulic inorganic material, the kind of the water-soluble polymer and the amounts of these ingredients used. The amount of water used should be so determined as to cause the resultant mixture to exhibit good kneadability, and is generally 5 to 40% by weight, preferably 7 to 30% by weight, based on the non-hydraulic inorganic material.

In the present invention, an isocyanate compound may be used in order to enhance the water resistance of the dried and hardened material. Examples of the isocyanate compound include monoisocyanate compounds such as phenyl isocyanate compounds, butyl isocyanate, etc.; diisocyanate compounds such as 4,4'-diphenylmethane diisocyanate, tolylene diisocyanate, hexamethylene diisocyanate, lysine diisocyanate, trimethylhexamethylene diisocyanate, isophorone diisocyanate, diisocyanate of hydrogenated 4,4'-diphenylmethane, etc.: polyisocyanate compounds such as polymethylene polyphenylene polyisocyanate, trimer of hexamethylene diisocyanate, isophorone diisocyanate, etc.; reaction compounds of a di- or higher polyisocyanate compound with a polyol, e.g., a reaction product of hydrogenated bisphenol A (1 mole) with hexamethylene diisocyanate (2 moles) or a reaction product of trimethylolpropane (1 mole) with hexamethylene diisocyanate (3 moles), etc. Furthermore, blocked type isocyanate compounds obtained by blocking a mono-, di- or poly- isocyanate compound with phenol or the like and isocyanate compounds obtained by carbodiimidizing part of the isocyanate groups in a di- or poly-isocyanate compound, and the like can also be mentioned. One or more of these isocyanate compounds may be used either singly or in combination. Those isocyanate compounds which have high viscosity or are solid are used in the state of being diluted with or dissolved in a solvent (benzene, toluene, xylene, etc.) unreactive to the isocyanate compounds. Preferable isocyanate compounds are di- or higher polyisocyanate compounds.

The treatment with the isocyanate compound mentioned above gives a favorable effect particularly when a polymer having hydroxyl groups is selected as the water-soluble polymer.

Now, the process for producing a high-strength composite material according to the present invention is explained below. In the present invention, the non-hydraulic inorganic material, the water-soluble polymer and water are roughly mixed with each other by a mixer such as a paddle-type mixer and a planetary mixer. Next, kneading is conducted, by using an apparatus capable of exerting a strong shearing force on the roughly mixed material, for instance, a roller kneader, a Banbury mixer, a wet-type pan mixer, a mixing roll, a knett machine, a bag mill, a screw extruder, a kneader-ruder, a pressure kneader, etc. This molding machine is not particularly limited, and, in general, a calender roll, a low- or high-pressure press, a (vacuum) extruding machine or the like is used. Particularly when a method by which molding can be carried out under a reduced pressure is used, for instance, when a vacuum extruder is used, a hardened body having a high flexural strength with little dispersion of flexural strength properties is obtained, and such a method is preferable. The molding is followed by drying. The present invention is characterized in that, unlike in the case of using a hydraulic cement, a curing step is unnecessary and a hardened body with high strength is obtainable by only drying. The drying temperature is not specifically restricted, and is ordinarily 60° to 90° C. Drying may be carried out at normal temperature (10° to 50° C.) under a low humidity of not more than 50% (relative humidity). When a method comprising gradual drying (preliminary drying) carried out at normal temperature followed by drying at a high temperature (e.g., 80° to 120° C.) performed for 5 to 15 hours is adopted, it is possible to reduce the strain induced in the hardened body during the drying, and such a method is preferable. The hardened body thus obtained is impregnated with an isocyanate compound, if necessary.

As a method for the impregnation, a method of direct immersion of the hardend body in the isocyanate compound or a method of immersion of the hardened body in a solution of the isocyanate compound in the above-mentioned organic solvent may be employed. A method in which immersion of the dried and hardened body is carried out under a reduced pressure to remove bubbles from the hardened body while the isocyanate compound is permitted to penetrate into the hardened body and, further, a method in which the just mentioned treatment is followd by a pressurizing treatment to accelerate the penetration of the isocyanate compound are also usable. Moreover, a method of simply impregnating the hardened body with the isocyanate compound under a reduced pressure or under pressurization can also be used.

The impregnation can be performed satisfactorily at normal temperature (10° to 50° C.), and the impregnation is carried out for about 1 to 24 hours under normal pressure or for about 1 to 24 hours under a reduced pressure or under pressurization.

When the impregnating treatment is carried out by such a method as mentioned above, the content of the isocyanate compound in the dried and hardened body is generally 1 to 20%. The hardened body impregnated with the isocyanate compound is then subjected to a heat treatment. The heating temperature is preferably 60° to 180° C. The heating time, which depends on the heating temperature, is generally 0.5 to 24 hours. The heat treatment may be carried out in several steps at different temperatures.

The high-strength composite material of the present invention, obtained in the manner as mentioned above, is characterized by a high flexural strength and, in addition, extremely excellent water resistance.

BEST MODE FOR CARRYING OUT THE INVENTION

The present invention will now be explained more in detail while referring to the following examples, which naturally should not be construed as limitative of the present invention. The term "parts" used in the following examples means "parts by weight".

EXAMPLE 1

One thousand (1000) parts of a blast-furnace slag powder (Esment® -P, a product by NIPPON STEEL CHEMICAL CO., LTD.) and 100 parts of sodium polyacrylate (Panakayaku® -B, a product by NIPPON KAYAKU K.K.) were placed in an Omni-mixer ® (made by CHIYODA GIKEN KOGYO K.K.) and were mixed. Then 190 parts of water was added to the resultant mixture, followed again by mixing. The thus obtained mixture was kneaded by a twin-roll kneader under a high shearing force for 5 minutes. The kneaded material (dough), which was clay-like, was extruded by a vacuum extruding machine (Model HDE-2, a product by HONDA TEKKO K.K.) into a plate-like shape (10 cm wide and 4 mm thick). The thus molded material was cut by a knife to a 10 cm length, which was left to stand for one day in a thermo-hygrostat at 30° C. and 50% RH (preliminary drying), and then dried for 8 hours in a hot-air dryer at 80° C. Hardening was not observed during molding, and the dough did not show a hardening phenomenon when left to stand for one day, unless it was dried. The hardened body thus obtained was cut by a diamond cutter to have a width of 1.5 cm and a length of 8 cm, thereby preparing a three-point bending test specimen. The three-point bending test was carried out on a Tensilon (UTM2500, a product by Orientec Corporation) under the conditions of a span (interval) of 6 cm and a loading speed of 1 mm/min. The results are shown in Table 1. The "specific gravity" refers to the specific gravity of the hardened body (the same applied hereinbelow).

TABLE 1

| Flexural strength kgf/cm$^2$ | Bending modulus of elasticity × 10$^5$ kgf/cm$^2$ | Specific gravity |
| --- | --- | --- |
| 1191 | 3.27 | 2.17 |

EXAMPLE 2

The same procedure as in Example 1 was carried out, except that 100 parts of carboxymethyl cellulose (CMC-1160, a product by DAICEL CHEMICAL INDUSTRIES, LTD.) as a water-soluble polymer and 230 parts of water were used. The results are shown in Table 2.

TABLE 2

| Flexural strength kgf/cm$^2$ | Bending modulus of elasticity × 10$^5$ kgf/cm$^2$ | Specific gravity |
| --- | --- | --- |
| 496 | 1.16 | 1.93 |

EXAMPLES 3–12

One thousand (1000) parts of a blast-furnace slag powder (Esment ® -P, a product by NIPPON STEEL CHEMICAL CO.. LTD.) or 1000 parts of talc (Hitachi-Talc HT-300, a product by KUNIMINE INDUSTRIES CO., LTD.), and a water-soluble polymer of the kind and in the amount shown in Table 3 below were placed in an Omni-mixer ® (made by Chiyoda Giken Kogyo K.K.) and were mixed. To the resultant mixture, water was added in the amount shown in Table 3, followed again by mixing. The thus obtained mixture was kneaded by a twin-roll kneader under a high shearing force for 5 minutes. The thus kneaded material (dough), which was clay-like, was sandwiched between a pair of upper and lower sheets of polyethylene terephthalate film, and was press molded under a pressure of 30 kgf/cm$^2$ to obtain a 4 mm thick plate-like molded material. The dough was not hardened even when left to stand for a long time. The molded material was left to stand for one day in a thermo-hygrostat at 30° C. and 50% RH (preliminary drying), and was then dried for 8 hours in a hot-air dryer at 80° C. The hardened body thus obtained was cut by a diamond cutter to a width of 1.5 cm and a length of 8 cm, to prepare a three-point bending test specimen. The three-point bending test was carried out on a Tensilon (UTM-2500, a product by Orientec Corporation) under the conditions of a span of 6 cm and a loading speed of 1 mm/min. The results are shown in Table 3.

TABLE 3

| Example | Non-hydraulic inorganic material | Amount of water-soluble polymer used (parts) | Amount of water used (parts) | Flexural strength kgf/cm$^2$ | Bending modulus of elasticity × 10$^5$ kgf/cm$^2$ | Specific gravity |
| --- | --- | --- | --- | --- | --- | --- |
| 3 | Blast-furnace slag powder *6 | Sodium Polyacrylate *1 70 | 150 | 642 | 2.15 | 1.86 |
| 4 | | Cationized Polyacrylamide *2 70 | 110 | 365 | 1.21 | 1.95 |
| 5 | | Anionized Polyacrylamide *3 70 | 160 | 519 | 1.73 | 1.83 |
| 6 | | Polyacrylamide *4 50 | 150 | 442 | 2.07 | 1.85 |
| 7 | | Carboxymethyl cellulose *5 60 | 220 | 396 | 1.35 | 1.93 |
| 8 | Talc *7 | Sodium Acrylamide 70 | 160 | 514 | 1.70 | 1.88 |
| 9 | | Cationized Acrylamide 70 | 140 | 264 | 1.19 | 2.00 |
| 10 | | Anionized Acrylamide 50 | 140 | 311 | 1.60 | 1.97 |
| 11 | | Polyacrylamide 100 | 180 | 493 | 2.29 | 1.87 |
| 12 | | Carboxymethyl cellulose | 300 | 356 | 1.21 | 1.79 |

TABLE 3-continued

| Example | Non-hydraulic inorganic material | Amount of water-soluble polymer used (parts) | Amount of water used (parts) | Flexural strength kgf/cm$^2$ | Bending modulus of elasticity × 10$^5$ kgf/cm$^2$ | Specific gravity |
|---|---|---|---|---|---|---|
| | | 70 | | | | |

*1: Panakayaku ® -B, a product by NIPPON KAYAKU CO., LTD.
*2: Kayafloc ® C-566-2 (a copolymer of sulfate of dimethylaminoethyl methacrylate with acrylamide), a product by NIPPON KAYAKU CO., LTD.
*3: Kayafloc ® A-275 (a copolymer of sodium acrylate with acrylamide), a product by NIPPON KAYAKU CO., LTD.
*4: Kayafloc ® N-100 (a polyacrylamide), a product by NIPPON KAYAKU CO., LTD.
*5: CMC-1160, a product by DAICEL CHEMICAL INDUSTRIES, LTD.
*6: Esment ® -P, a product by NIPPON STEEL CHEMICAL CO., LTD.
*7: Hitachi-Talc HT-300, a prodcut by KUNIMINE INDUSTRIES CO., LTD.

EXAMPLES 13-23

High-strength composite materials according to the present invention were obtained in the same manner as in Examples 3 to 12 except that 1000 parts of a non-hydraulic inorganic material of the kind shown in Table 4 below, sodium polyacrylate or polyacrylamide in the amount shown in Table 4 and water in the amount shown in Table 4 were used.

TABLE 4

| Example | Non-hydraulic inorganic material | Amount of water-soluble polymer used (parts) | | Amount of water used (parts) | Flexural strength kgf/cm$^2$ | Bending modulus of elasticity × 10$^5$ kgf/cm$^2$ | Specific gravity |
|---|---|---|---|---|---|---|---|
| 13 | Talc *3 | Sodium polyacryl-amide *1 | 60 | 150 | 480 | 1.76 | 1.89 |
| 14 | Calcium carbonate *4 | | 70 | 150 | 454 | 2.28 | 1.91 |
| 15 | Silica sand *5 | | 70 | 150 | 511 | 1.78 | 1.91 |
| 16 | Bentonite *6 | | 70 | 300 | 482 | 1.07 | 1.92 |
| 17 | Diatomaceous earth *7 | | 70 | 250 | 255 | 0.82 | 1.50 |
| 18 | Clay *8 | | 50 | 140 | 244 | 1.98 | 2.01 |
| 19 | Blast-furnace slag | Polyacryl-amide *2 | 40 | 140 | 422 | 2.18 | 1.98 |
| 20 | Calcium carbonate | | 70 | 160 | 415 | 2.02 | 1.95 |
| 21 | Silica sand | | 70 | 160 | 348 | 1.55 | 1.74 |
| 22 | Bentonite | | 100 | 300 | 281 | 0.49 | 1.90 |
| 23 | Clay | | 100 | 180 | 498 | 2.05 | 1.80 |

*1: Panakayaku ® -B, a product by NIPPON KAYAKU CO., LTD.
*2: Kayafloc ® N-100 (a polyacrylamide), a product by NIPPON KAYAKU CO., LTD.
*3: Hitachi-Talc HT-300, a product by KUNIMINE INDUSTRIES CO., LTD.
*4: White P70, a product by SHIRAISHI KOGYO KAISHA LTD.
*5: SR-200, a product by KYORITSU CERAMIC MATERIALS CO., LTD.
*6: Kunigel ® VA, a product by KUNIMINE INDUSTRIES CO., LTD.
*7: Oplite W3050, a product by HOKUSHU KEISODO K.K.
*8: NK-300, a product by KUNIMINE INDUSTRIES CO., LTD.

EXAMPLES 24-27

One hundred (100) parts of talc [Hitachi-Talc HT-300, a product by KUNIMINE INDUSTRIES CO., LTD.] and 7 parts of a partially hydrolyzable polyvinyl acetate (KH-17S, a product by THE NIPPON SYNTHETIC CHEMICAL INDUSTRY CO., LTD.) were placed in an Omni-mixer ® (made by CHIYODA GIKEN KOGYO K.K.) and were mixed. Then, 16 parts of water was added to the resultant mixture, followed again by mixing. The thus obtained mixture was kneaded by a twin-roll kneader under a high shearing force for 5 minutes. The kneaded material (dough), which was clay-like, was extruded by a vacuum extruding machine (Model HDE-2, a product by HONDA Tekko K.K.) into a plate-like shape (10 cm wide and 4 mm thick). The thus molded material was cut by a knife to a 10 cm length, which was left to stand for one day in a thermo-hygrostat at 30° C. and 50% RH, and then dried for 8 hours in a hot-air dryer at 80° C. The hardened body thus obtained was cut by a diamond cutter, to obtain a large number of samples having a width of 1.5 cm and a length of 8 cm. The samples were immersed respectively in hexamethylene diisocyanate (HDI, a product by NIPPON POLYURETHANE INDUSTRY CO., LTD.) [Example 24], tolylene diisocyanate (Millionate ® T-80, a product by NIPPON POLYURETHANE INDUSTRY CO., LTD.) [Example 25], a polymethylene polyphenylene polyisocyanate diluted with toluene to 50 (V/V)% (Millionate ® MR-200. a product by NIPPON POLYURETHANE INDUSTRY CO., LTD.) [Example 26], a carbodiimide-modified isocyanate diluted with toluene to 70 (V/V)% (Coronate ® -MTL-C, a product by NIPPON POLYURETHANE INDUSTRY CO., LTD.) [Example 27], in a vacuum chamber at 15° C. for 10 hours, and were then subjected to a heating treatment in a constant-temperature dryer at 90° C. for 20 hours. The samples thus obtained were found to contain about 3 to 15% of the isocyanate compound in the hardened body, by determination of the change in weight of the smaple through the impregnation. The samples thus obtained were immersed in water at 25° C. for one day, and subjected to three-point bending tests in a wet state. The three-point bending tests were carried out also for the samples not immersed in water. The three-point bending tests were carried out on a Tensilon (UTM-2500, a product by Orientec Corporation) under the conditions of a span of 6 cm and a loading speed of 1 mm/min. The results are shown in Table 5.

TABLE 5

| Example | Isocyanate compound | Properties before immersion water | | Properties after immersion in water for one day | |
|---|---|---|---|---|---|
| | | Flexural strength kgf/cm$^2$ | Bending modulus of elasticity × 10$^5$ kgf/cm$^2$ | Flexural strength kgf/cm$^2$ | Bending modulus of elasticity × 10$^5$ kgf/cm$^2$ |
| Example 24 | Hexamethylene diisocyanate | 630 | 1.68 | 610 | 1.45 |
| Example 25 | Tolylene diisocyanate | 650 | 1.90 | 350 | 1.22 |
| Example 26 | Polymethylene polyphenylene polyisocyanate | 610 | 1.65 | 480 | 1.32 |
| Example 27 | Carbodiimide-modified isocyanate | 660 | 1.74 | 580 | 1.38 |

EXAMPLES 28-32

The same procedure as in Examples 24 to 26 was repeated except that a clay (NK-300, a product by KUNIMINE INDUSTRIES CO., LTD.) was used as a non-hydraulic inorganic material, the amount of water was changed to 15 parts, and that trimer of hexamethylene diisocyanate diluted with toluene to 50 (V/V)% [Coronate ® EH, a product by NIPPON POLYURETHANE INDUSTRY CO., LTD.) and a reaction product of hydrogenated bisphenol A (1 mole) with hexamethylene diisocyanate (2 moles) diluted with toluene to 50 (V/V)% (Coronate ® 2094, a product by NIPPON POLYURETHANE INDUSTRY CO., LTD.) were added as the isocyanate compound. The results are shown in Table 6.

EXAMPLES 33-36

One hundred (100) parts of silica sand (SR-200, a product by KYORITSU CERAMIC MATERIALS CO., LTD.) as a non-hydraulic inorganic material and 5 parts of partially hydrolyzable polyvinyl acetate (KH-17S, a product by NIPPON SYNTHETIC CHEMICAL INDUSTRY CO., LTD.) were placed in Omnimixer ® and were mixed. To the resultant mixture, 14 parts of water was added, followed again by mixing. The mixture thus obtained was kneaded by a twin-roll kneader under a high shearing force for 5 minutes. The kneaded mixture was clay-like, which was sandwiched between a pair of upper and lower sheets of polyethylene terephthalate film, and press-molded under a pressure of 300 kgf/cm$^2$ to obtain a plate-like shape 4 mm thick. The molded material was subjected to drying and treatment with an isocyanate compound, in the same manner as in Examples 24 to 27. The results are shown in Table 7.

TABLE 6

| Example | Isocyanate compound | Properties before immersion water | | Properties after immersion in water for one day | |
|---|---|---|---|---|---|
| | | Flexural strength kgf/cm$^2$ | Bending modulus of elasticity × 10$^5$ kgf/cm$^2$ | Flexural strength kgf/cm$^2$ | Bending modulus of elasticity × 10$^5$ kgf/cm$^2$ |
| Example 28 | Hexamethylene diisocyanate | 700 | 1.95 | 680 | 1.64 |
| Example 29 | Tolylene diisocyanate | 730 | 2.08 | 720 | 1.97 |
| Example 30 | Polymethylene polyphenylene polyisocyanate | 710 | 1.90 | 620 | 1.83 |
| Example 31 | Trimer of hexamethylene diisocyanate | 560 | 1.38 | 380 | 0.29 |
| Example 32 | Hydrogenated bisphenol A & Hexamethylene diisocyanate | 540 | 1.21 | 320 | 0.22 |

TABLE 7

| Example | Isocyanate compound | Properties before immersion water | | Properties after immersion in water for one day | |
|---|---|---|---|---|---|
| | | Flexural strength kgf/cm$^2$ | Bending modulus of elasticity × 10$^5$ kgf/cm$^2$ | Flexural strength kgf/cm$^2$ | Bending modulus of elasticity × 10$^5$ kgf/cm$^2$ |
| Example 33 | Hexamethylene diisocyanate | 570 | 1.31 | 550 | 1.22 |
| Example 34 | Tolylene diisocyanate | 520 | 1.42 | 440 | 1.05 |
| Example 35 | Polymethylene | 530 | 1.27 | 360 | 0.70 |

TABLE 7-continued

| Example | Isocyanate compound | Properties before immersion water | | Properties after immersion in water for one day | |
|---|---|---|---|---|---|
| | | Flexural strength kgf/cm$^2$ | Bending modulus of elasticity × 10$^5$ kgf/cm$^2$ | Flexural strength kgf/cm$^2$ | Bending modulus of elasticity × 10$^5$ kgf/cm$^2$ |
| Example 36 | polyphenylene polyisocyanate Carbodiimide-modified isocyanate | 550 | 1.28 | 480 | 1.18 |

EXAMPLES 37–40

The same procedure as in Examples 33 to 36 was repeated except that 100 parts of a talc (Hitachi-Talc HT-300, a product by KUNIMINE INDUSTRIES CO., LTD.) as a non-hydraulic inorganic material, 7 parts of a hydroxypropylmethyl cellulose (Marpolose® EMP-H, a product by MATSUMOTO YUSMI-SEIYAKU CO., LTD.) as a water-soluble polymer and 15 parts of water were used. The results are shown in Table 8.

EXAMPLES 41–44

The same procedure as in Examples 33 to 36 was repeated except that 8.5 parts of hydroxyethyl cellulose [HEC (SP-850), a product by DAICEL CHEMICAL INDUSTRIES, LTD.] as a water-soluble polymer and 20 parts of water were used. The results are shown in Table 9.

TABLE 9

| Example | Isocyanate compound | Properties before immersion water | | Properties after immersion in water for one day | |
|---|---|---|---|---|---|
| | | Flexural strength kgf/cm$^2$ | Bending modulus of elasticity × 10$^5$ kgf/cm$^2$ | Flexural strength kgf/cm$^2$ | Bending modulus of elasticity × 10$^5$ kgf/cm$^2$ |
| Example 41 | Hexamethylene diisocyanate | 500 | 1.54 | 500 | 1.58 |
| Example 42 | Tolylene diisocyanate | 510 | 1.51 | 400 | 1.39 |
| Example 43 | Polymethylene polyphenylene polyisocyanate | 470 | 1.48 | 370 | 1.46 |
| Example 44 | Carbodiimide-modified isocyanate | 490 | 1.55 | 410 | 1.32 |

EXAMPLES 45–48

The same procedure as in Examples 33 to 36 was repeated except that a blast-furnace slag powder (Esment® -P, a product by NIPPON STEEL CHEMICAL CO., LTD.) was used as a non-hydraulic inorganic material. The results are shown in Table 10.

TABLE 8

| Example | Isocyanate compound | Properties before immersion water | | Properties after immersion in water for one day | |
|---|---|---|---|---|---|
| | | Flexural strength kgf/cm$^2$ | Bending modulus of elasticity × 10$^5$ kgf/cm$^2$ | Flexural strength kgf/cm$^2$ | Bending modulus of elasticity × 10$^5$ kgf/cm$^2$ |
| Example 37 | Hexamethylene diisocyanate | 430 | 1.25 | 430 | 1.15 |
| Example 38 | Tolylene diisocyanate | 400 | 1.33 | 340 | 1.03 |
| Example 39 | Polymethylene polyphenylene polyisocyanate | 440 | 1.41 | 430 | 1.28 |
| Example 40 | Carbodiimide-modified isocyanate | 460 | 1.28 | 380 | 1.18 |

TABLE 10

| Example | Isocyanate compound | Properties before immersion water | | Properties after immersion in water for one day | |
|---|---|---|---|---|---|
| | | Flexural strength kgf/cm$^2$ | Bending modulus of elasticity × 10$^5$ kgf/cm$^2$ | Flexural strength kgf/cm$^2$ | Bending modulus of elasticity × 10$^5$ kgf/cm$^2$ |
| Example 45 | Hexamethylene diisocyanate | 670 | 1.96 | 360 | 1.02 |
| Example 46 | Tolylene diisocyanate | 630 | 1.75 | 290 | 0.98 |
| Example 47 | Polymethylene polyphenylene polyisocyanate | 690 | 1.86 | 300 | 0.88 |
| Example 48 | Carbodiimide-modified isocyanate | 650 | 1.79 | 270 | 0.73 |

EXAMPLE 49

The same procedure as in Example 26 was repeated except that 90 parts of a clay (NK-800, a product by KUNIMINE INDUSTRIES CO., LTD.) and 10 parts of silica fume were used as a non-hydraulic inorganic material, and the heating treatment after impregnation with the isocyanate compound was carried out at 80° C. for 2 hours, at 120° C. for 3 hours and at 150° C. for 1 hour. The samples thus obtained were immersed in water for 1 day and 7 days, respectively, and were subjected to three-point bending test. The results are shown in Table 11.

TABLE 11

| Example | Isocyanate compound | Properties before immersion water | | Properties after immersion in water for one day | | Properties after immersion in water for 7 days | |
|---|---|---|---|---|---|---|---|
| | | Flexural strength kgf/cm$^2$ | Bending modulus of elasticity × 10$^5$ kgf/cm$^2$ | Flexural strength kgf/cm$^2$ | Bending modulus of elasticity × 10$^5$ kgf/cm$^2$ | Flexural strength kgf/cm$^2$ | Bending modulus of elasticity × 10$^5$ kgf/cm$^2$ |
| Example 45 | Polymethylene polyphenylene polyisocyanate | 953 | 2.62 | 932 | 2.20 | 824 | 1.85 |

INDUSTRIAL APPLICABILITY

The present invention provides a high-strength composite material which is produced from a non-hydraulic inorganic material, is easy to knead and to mold and has a high flexural strength after drying and shows little lowering in the flexural strength even upon being wetted with water.

What is claimed is:

1. A composite material having a flexural strength of 244 to 1191 kgf/cm$^2$ which is obtained by kneading a mixture comprising a non-hydraulic inorganic material selected from the group consisting of blast-furnace slag powder, silica fume, fly ash, silica sand, silica rock powder, calcium carbonate, talc, clay, zeolite, pearlite, diatomaceous earth, kaolin, alumina, titania and zirconia, a water-soluble polymer and water, the water being present in an amount of 5 to 30% by weight based on the non-hydraulic inorganic material, molding the kneaded mixture, and drying the thus molded material.

2. A high-strength composite material according to claim 1, wherein the water-soluble polymer is a water-soluble polymer having the -OH group.

3. A composite material according to claim 1, obtained by treating the dried molded material with an isocyanate compound.

4. A process for producing a composite material having a flexural strength of 244 to 1191 kgf/cm$^2$ which comprises the steps of kneading a mixture comprising a non-hydraulic inorganic material selected from the group consisting of blast-furnace slag powder, silica fume, fly ash, silica sand, silica rock powder, calcium carbonate, talc, clay, zeolite, pearlite, diatomaceous earth, kaolin, alumina, titania and zirconia, a water-soluble polymer and water, the water being present in an amount of 5 to 30% by weight based on the non-hydraulic inorganic material, molding the kneaded mixture, and drying the thus molded material.

* * * * *